(12) United States Patent
Gercke et al.

(10) Patent No.: US 10,058,898 B2
(45) Date of Patent: Aug. 28, 2018

(54) DEVICE AND METHOD FOR REMOVING IMPURITIES FROM SHREDDED PLASTIC

(71) Applicant: CVP Clean Value Plastics GmbH, Hamburg (DE)

(72) Inventors: Alexander Gercke, Bad Oldesloe (DE); Michael Hofmann, Hamburg (DE); Carsten Wermter, Hamburg (DE)

(73) Assignee: CVP Clean Value Plastics GmbH, Hamburg (DE)

(*) Notice: Subject to any disclaimer, the term of this patent is extended or adjusted under 35 U.S.C. 154(b) by 231 days.

(21) Appl. No.: 14/761,572

(22) PCT Filed: Jan. 15, 2014

(86) PCT No.: PCT/EP2014/050680
§ 371 (c)(1),
(2) Date: Jul. 16, 2015

(87) PCT Pub. No.: WO2014/111412
PCT Pub. Date: Jul. 24, 2014

(65) Prior Publication Data
US 2015/0352601 A1    Dec. 10, 2015

(30) Foreign Application Priority Data

Jan. 16, 2013  (DE) .................. 10 2013 000 593

(51) Int. Cl.
*B08B 1/00* (2006.01)
*B08B 1/04* (2006.01)
(Continued)

(52) U.S. Cl.
CPC .............. *B08B 1/001* (2013.01); *B08B 1/04* (2013.01); *B08B 3/04* (2013.01); *B29B 17/02* (2013.01); *D21D 1/22* (2013.01); *B29B 2017/0289* (2013.01); *B29L 2031/7158* (2013.01); *B29L 2031/7164* (2013.01); *Y02W 30/622* (2015.05)

(58) Field of Classification Search
CPC .. B29B 17/02; B29B 2017/0289; D21D 1/22; B08B 1/001; B08B 3/04; B08B 1/04;
(Continued)

(56) References Cited

U.S. PATENT DOCUMENTS 2,980,350 A * 4/1961 Lejeune .................. D21D 1/22
241/261.1
3,260,469 A * 7/1966 Perdreau .................. B02C 7/13
236/92 A
(Continued)

FOREIGN PATENT DOCUMENTS

CN    101151131 A    3/2008
CN    101481887 A    7/2009
(Continued)

*Primary Examiner* — Michael Barr
*Assistant Examiner* — Benjamin L Osterhout
(74) *Attorney, Agent, or Firm* — Young Basile Hanlon & MacFarlane, P.C.

(57) ABSTRACT

A device for removing impurities from shredded plastic includes at least one first cleaning body having a sectionally tapered and/or cylindrical outer surface forming a first cleaning surface, and at least one second cleaning body having a sectionally tapered and/or cylindrical inner surface forming a second cleaning surface. The second cleaning body accommodates the first cleaning body such that the cleaning surfaces oppose each other and delimit a cleaning gap between each other. A drive apparatus can rotate at least one of the cleaning bodies about its longitudinal axis, and a feed apparatus feeds the shredded plastic into the cleaning gap. The cleaning surfaces each have cleaning ribs, wherein at least one flank of the cleaning ribs is inclined or curved. Cleaning bars running transversally to the direction of extension of the cleaning ribs are arranged between at least some neighboring cleaning ribs.

22 Claims, 5 Drawing Sheets

(51) Int. Cl.
*B08B 3/04* (2006.01)
*B29B 17/02* (2006.01)
*D21D 1/22* (2006.01)
*B29L 31/00* (2006.01)

(58) Field of Classification Search
CPC .... B29L 2031/7158; B29L 2031/7164; Y02W 30/622
See application file for complete search history.

(56) References Cited

U.S. PATENT DOCUMENTS

| | | | |
|---|---|---|---|
| 4,953,796 A | | 9/1990 | Virving |
| 5,048,768 A | * | 9/1991 | Bernhard ................ D21B 1/14 241/261.1 |
| 5,228,629 A | * | 7/1993 | Bernhard ................ D21D 1/22 241/261.1 |
| 7,757,974 B2 | | 7/2010 | Hofmann et al. |
| 8,388,873 B2 | | 3/2013 | Hofmann et al. |
| 2002/0117565 A1 | * | 8/2002 | Yajima ...................... B03B 9/06 241/24.2 |
| 2003/0071153 A1 | * | 4/2003 | Aikawa ................... D21D 1/20 241/246 |

FOREIGN PATENT DOCUMENTS

| | | |
|---|---|---|
| DE | 10 2005 013 693 A1 | 9/2006 |
| EP | 2 077 352 A1 | 7/2009 |
| JP | H02502389 A | 8/1990 |
| WO | 2008/058750 A2 | 5/2008 |

\* cited by examiner

DEVICE AND METHOD FOR REMOVING IMPURITIES FROM SHREDDED PLASTIC

FIELD OF THE DISCLOSURE

The invention relates to a device and method for removing impurities from shredded plastic.

BACKGROUND

Plastic waste such as PET beverage bottles, blister packages made of PET (thermoformed PET films), plastic waste consisting of polyolefins or the like, must be cleaned during recycling. Very high quality requirements must be satisfied. The permissible impurities fluctuate within the ppm range. For cleaning, the plastic waste is first comminuted into shredded plastic, in particular so-called plastic flakes. Shredded plastic that has been optimally comminuted beforehand is a requirement for the cleaning process and continuous feeding of a cleaning system. In particular, the shredded plastic should be generated as evenly as possible with a small amount of fines. It is known to use a shredder for this (a rotor with blades and opposing blades and a strainer basket) or other comminution aggregates such as cutting mills. The generated flake size is influenced by the hole diameter in the strainer basket. Metals are removed from the plastic waste while pre-sorting by means of magnetic and eddy current separators.

Conventionally, sorting according to colors and/or plastic types occurs before the comminution of the plastic waste. This is, however, associated with restrictions due to the contamination of the plastic waste because the identification rate of contaminated materials is less than with clean materials. Furthermore, several washing lines need to be operated when sorting before cleaning in order to clean the individual fractions. It is, however, also possible to first initially comminute plastic waste of different colors and/or different plastic types and then clean it, and only perform the sorting by colors and/or plastic types at the end of the process by means of color recognition, or respectively NIR, laser or x-ray spectroscopy. This can be done in an incident light process and/or a transillumination process with a suitable optical detector apparatus (e.g., a camera).

When recycling plastic flakes, in particular PET flakes, the following requirements must be satisfied:
1. Removal of film and cellulose labels;
2. Removal of cellulose;
3. Cleaning contaminants from contents from the flakes (such as beverage residue);
4. Cleaning adhering contaminants from the flakes (such as adhesives from labels);
5. Removal of metals (such as corrugated metal and aluminum cans);
6. Removal of foreign plastics; and
7. Sorting according to color (such as clear PET and colored PET).

Similar requirements (however with higher thresholds) apply to the mechanical recycling of plastics. However, sorting according to color is generally omitted.

A method for removing cellulose and other adhering materials while recycling waste plastic, especially mixed plastic, is known from WO 2008/058750 A2. A toothed disk mill can be used with disks that have engaging teeth which are arranged spaced on concentric circles. Between the teeth of a circle, the gaps are large enough for pieces consisting of thicker or solid material to pass through freely. A disk mill is also known from DE 10 2005 013 693 A1.

However, sufficient cleaning of the impurities from the plastic waste is not always achieved in practice. This holds true in particular for the cleaning of flat shredded plastic. With such flat shredded plastic or flakes, folding can occur during cleaning so that only the outer surfaces are cleaned whereas the insides remain dirty.

SUMMARY

On the basis of the above-explained prior art, an object of the invention is to provide a device and a method for removing impurities from shredded plastic by means of which improved cleaning is achieved.

In a device described herein, embodiments of the invention achieve the object in that each of the cleaning bodies has a plurality of cleaning ribs extending over its cleaning surface, wherein at least one flank of the cleaning ribs is inclined or curved, and that a plurality of cleaning bars running perpendicular to the direction of extension of the cleaning ribs is arranged between at least some cleaning ribs neighboring each other.

As noted above, the device serves to clean shredded plastic. As also noted above, the shredded plastic arises from the comminution of plastic waste, such as plastic packages like beverage bottles or the like. The shredded plastic comprises previously comminuted flat plastic waste that can exist in the form of flakes (thin-walled hard plastics, films, etc.) or in the form of plastic chunks (thick-walled hard plastics) with a largely defined size. As also noted above, the impurities to be removed can in particular be surface adhesions such as residual cellulose, residual adhesive, residual labelling or organic contaminants.

The device according to embodiments of the invention has a first and second cleaning body. The cleaning bodies each possess at least sectionally in particular a tapered, or respectively conical, and/or a (regular) cylindrical cleaning surface. The cleaning surfaces can be completely tapered, or respectively conical, or completely cylindrical. It is, however, also possible for the cleaning surfaces to have tapered, or respectively conical as well as cylindrical sections. It is also possible for the cleaning surfaces to have a plurality of, for example, two tapered, or respectively conical sections that possess different tapered, or respectively conical angles. The cleaning surfaces can each extend over the entire outer, or respectively inner surface of the cleaning bodies, or only over one or more sections of the outer, or respectively inner surface of the cleaning bodies. The first cleaning body can possess the shape of a cone or truncated cone, or respectively a cylinder. The second cleaning body can possess the shape of a hollow cone or hollow truncated cone, or respectively a hollow cylinder.

During operation, the first cleaning body is inserted along its longitudinal axis into the second cleaning body, wherein the opposing cleaning surfaces delimit a cleaning gap between them that is also tapered, or respectively conical, and/or cylindrical. The first cleaning body and/or the second cleaning body is rotationally driven about its longitudinal axis during operation by means of a suitable drive. The device hence forms a so-called conical refiner or drum refiner. The drive can be an electric drive. The width of the cleaning gap can easily be adjusted by moving the first and/or second cleaning body along its longitudinal axis. However, other ways of adjusting the width of the cleaning gap are also possible. It is also conceivable for the cleaning gap to be fixed, i.e., not adjustable.

The cleaning bodies of the device have cleaning ribs that run over the cleaning surfaces, especially over the perimeter of the cleaning surfaces. The ribs can in particular be designed continuous, i.e., without interruptions in their direction of extension. The cleaning ribs can run straight or be curved. They can furthermore run in the longitudinal direction of the respective cleaning body over the respective cleaning surface. It is, however, also possible for them to be inclined or curved relative to the direction of the longitudinal axis, for example, screw-shaped, or respectively helical. Different zones can also be formed on the cleaning surfaces, wherein the cleaning ribs possess at least two, in particular more than two, zones with courses that differ from each other. Counter-directional zones can also be formed for a material return. At least one of the flanks of the cleaning ribs is inclined or curved, in particular with a cross-section inclined or curved relative to a vertical axis of the respective cleaning rib.

In the cross-section of the cleaning rib, the vertical axis of a cleaning rib is at a right angle, or respectively perpendicular on the surface of the respective cleaning body in the area in which the cleaning rib extends from the surface. In this respect, it corresponds to the surface normal. In the cross-section of the cleaning rib, the vertical axis runs in particular through the point at which the relevant flank of the cleaning rib begins starting from the surface of the cleaning rib. The vertical axis accordingly stands perpendicular upon the longitudinal direction of extension of the cleaning ribs. The corresponding flanks can each lie in a flat or curved surface. In this context, it is also possible for both flanks of the cleaning ribs to be inclined or curved, in particular in the cross-section relative to the vertical axis of the respective cleaning rib. Furthermore, cleaning bars are arranged between at least some, in particular all, cleaning ribs running adjacent to each other. They run transversally to the direction of extension of the cleaning ribs. They can run perpendicular to the direction of extension of the cleaning ribs. However, they can also run in a direction transversal to the direction of extension of the cleaning ribs at an angle less than or greater than 90° to the direction of extension of the cleaning ribs.

The inventors developed the invention based on the awareness that it is important to clean the shredded plastic without strong mechanical stress from compression, or deformation, when processing shredded plastic, in particular plastic flakes. Improved cleaning of the shredded plastic is achieved by reducing the mechanical stress (compression). In particular, folding or snarling the shredded plastic is avoided. The surfaces of the shredded plastic with the adhered components therefore remain accessible to cleaning. In addition, smooth shredded plastic has a greater bulk density and does not tend to interlock, thus improving its conveyability. In addition, smooth shredded plastic is easier to sort, in particular in sorting devices in which the shredded plastic falls from top to bottom under the effect of gravity. Accordingly, smooth shredded plastic forms a uniform "shredded plastic curtain." Finally, the generation of fines is prevented by the reduction of mechanical stress.

It has been revealed that the geometry of the cleaning bodies according to the teachings herein, in particular the inclination or curvature of at least one of the flanks of the cleaning ribs, yields such a reduced mechanical stress. Given the geometry of the cleaning bodies, the shredded plastic is drawn between the cleaning bodies, in particular between the cleaning ribs. Kinking, or folding or snarling, of the shredded plastic is avoided. Ideally, a single-grain layer of shredded plastic exists between the cleaning bodies, thus enabling surface impurities to be optimally cleaned from the shredded plastic. The surface of the cleaning ribs generates the necessary friction to clean the shredded plastic. In particular, given the cleaning body geometry according to the teachings herein, basically the entire surface of the shredded plastic is abraded, whereby all adhering contaminants are released. The addition of chemicals such as sodium hydroxide solution as is frequently necessary for cleaning in the prior art, is unnecessary. Instead, the geometry of the cleaning bodies or respectively of the cleaning surfaces results in sufficient cleaning of the shredded plastic without comminution of the shredded plastic occurring, or necessarily occurring.

Furthermore, given the geometry described herein, the shredded plastic is stretched slightly and thus pulled flat, and any folded shredded plastic (for example from initial comminution) is unfolded. In particular, it has been revealed that the majority of friction for abrading and hence cleaning the shredded plastic in the device occurs in the region of the inclined or curved flanks of the cleaning ribs. As mentioned, the corresponding flank does not necessarily have to lie in a flat plane. Instead, the flank can be curved, thus yielding a soft transition to the peak surface. It is important for the cleaning ribs to have a sufficiently large friction surface to produce a sufficient cleaning effect. The cleaning bars arranged in the channels between cleaning ribs function as barriers and force the shredded plastic between the cleaning bodies, in particular between the cleaning ribs of the cleaning bodies.

The abrasion of the shredded plastic achieved by the device has an additional advantageous effect beyond cleaning. The shredded plastic is thereby provided with a matte surface, which reflects light less strongly. This makes it easier to optically sort the shredded plastic following the cleaning process. With optical sorting, devices that function according to the incident light method for recognizing color, a highly glossy and hence reflecting surface is disadvantageous. Thus, improved recognition of the shredded plastic is achieved by the abrasion of the shredded plastic according to the teachings herein.

It should also be noted that the shredded plastic comprises in particular flat plastic particles. In particular with plastic that is less tough such as HDPE, a certain percentage of thicker plastic particles can also be obtained that are cleaned with the device according to the teachings herein.

The cleaning bodies designed in the manner described herein, with the relatively wide cleaning ribs arising from the inclined or curved flanks, wear out more slowly during operation than conventional cleaning bodies. In addition, the arrangement of the inclined or curved flanks of the cleaning ribs, together with the relative rotational movement between the cleaning bodies, generates a pumping effect. The shredded plastic to be cleaned is conveyed through the cleaning gap and is cleaned solely due to the geometry of the cleaning bodies and the relative rotational movement. A solids pump with an associated pump sump as is frequently provided in the prior art can therefore be discarded given a corresponding design of the geometry.

According to one design, the inclined or curved flanks of the cleaning ribs of the first and/or second cleaning body can be the leading flanks during rotation of the at least one cleaning body. With the cleaning body that is not rotationally driven, the leading flank of the cleaning ribs is the leading flank during the relative rotation between the cleaning bodies. With this design, the abrasion of the shredded plastic, and hence the cleaning, is performed in a particularly effective manner.

The degree of inclination or curvature of the flanks largely depends on the type of plastic to be cleaned, the shape of the shredded plastic, and the size distribution within the quantity of shredded plastic to be cleaned. It is decisive that comminution, or respectively compression, of the shredded plastic scarcely occurs. At the same time, the shredded plastic must be subject to a friction that is sufficient for cleaning. Hence, there must be sufficient space between the facing flanks of the neighboring cleaning ribs to accommodate the shredded plastic to be cleaned. With flat shredded plastic, flanks with a greater angle of inclination or angle of curvature relative to the vertical axis are suitable. In particular, the shredded plastic is drawn effectively between the cleaning bodies with a gradually sloping flank. In addition, a large abrasion surface is available, thus yielding a particularly favorable cleaning effect. With chunky shredded plastic, a smaller angle of inclination, or respectively angle of curvature, relative to the vertical axis is suitable. It is for example possible for the inclined flanks of the cleaning ribs of the first and/or second cleaning body to each possess an angle of inclination of at least 10°, preferably at least 30°, and more preferably at least 45°, relative to the vertical axis of the respective cleaning body. If the flanks of the cleaning ribs are curved, a line connecting the beginning and end of the curved flanks may posses an angle of inclination of at least 10°, preferably at least 30°, and more preferably at least 45° relative to the vertical axis of the respective cleaning rib in the cross section viewed perpendicular to the direction of extension of the cleaning ribs. The upper limits for the cited angles can for example be at least 45°, preferably at least 60°, and more preferably at least 80°.

According to another design, the cleaning ribs of the first and/or second cleaning body can (each) form a sawtooth profile in a direction running perpendicular to their longitudinal extension. In this direction, for example along one or more straight or curved or other types of paths, the cleaning ribs can form a sawtooth profile in a cross-section. The cleaning ribs can therefore basically transition directly into each other viewed in the cited direction. This prevents (horizontal) base surfaces between the neighboring cleaning ribs in which the shredded plastic may undesirably collect. It is, however, always also possible to provide base surfaces between neighboring cleaning ribs.

According to another design, the cleaning ribs of the first and/or second cleaning body can be rounded, at least at the transition between their at least one inclined or curved flank and their peak surface. Furthermore, the cleaning ribs of the first and/or second cleaning body can possess a peak surface that is perpendicular relative to its vertical axis. The peak surface can also lie in a plane parallel to the surface of the respective cleaning body in the area at which the cleaning rib extends from the surface. Of course, the cleaning ribs can also be rounded at the transition to a second flank that is possibly not inclined or curved. Since there is no sharp edge and in particular no sharp burr formed at the transition between the flank and the peak surface, a curling of the shredded plastic is avoided. Instead, the rounding and the peak surface ensure that the shredded plastic is drawn between the cleaning bodies and cleaned there in an unfolded, flat state.

The cleaning bars of the first and/or second cleaning body can rise ramp-like in a direction parallel to the longitudinal extension, or respectively the longitudinal axis of the cleaning ribs. This design causes the shredded plastic to be drawn into the processing area between the cleaning bodies in a particularly effective manner. According to another design, the cleaning bars of the first cleaning body can possess a lower height than the cleaning ribs of the first cleaning body, and/or the cleaning bars of the second cleaning body can possess a lower height than the cleaning ribs of the second cleaning body. In this design, the shredded plastic is processed more gently between the cleaning bodies because not all of the shreds are forced between the cleaning bodies at each cleaning bar. In particular, flakes that have a greater wall thickness than the cleaning gap between the cleaning ribs can slide through the resulting gap without being pulverized by the cleaning ribs.

According to another design, a distance can be provided between the peak surfaces of the cleaning ribs of the first cleaning surface and the peak surfaces of the cleaning ribs of the second cleaning surface, wherein the distance substantially corresponds to the average thickness of the shredded plastic, in particular of the primary grain class, fed by means of the feed apparatus. The distance between the cleaning bodies, and hence the thickness of the cleaning gap, is accordingly adapted to the thickness of the average anticipated plastic shreds. The distance between the cleaning bodies should, if possible, be adjusted so that only individual plastic shreds can pass between the cleaning bodies. This results in optimum cleaning by abrasion of the top and bottom sides of the plastic shreds. It is also advantageous when the shredded plastic to be cleaned has a very narrow variation in thickness. If a variation in thickness exists, the height of the cleaning bars can be selected so that the distance between the opposing cleaning bars corresponds to the average thickness of the thickest plastic shreds when the cleaning bodies are in a state of operation. The attainment of the optimum threshold thickness of the cleaning gap can be determined by the power consumption of the drive apparatus. The power consumption jumps suddenly when the thickness of the shredded plastic falls below the threshold. A cleaning gap of 0.25 mm for processing of disposable PET bottles, a cleaning gap of 0.50 mm for processing of reusable PET bottles (thicker wall), and a cleaning gap of 0.1 mm for processing film shreds are cited as examples. The respective suitable distance must be determined and adapted depending on the material.

The first and/or second cleaning body can in principle be designed as a single part, or consist of a plurality of cleaning body segments. The device can furthermore have a liquid feed apparatus by means of which liquid, in particular water or an aqueous solution, can be fed into the cleaning gap. The liquid feed serves to convey the shredded plastic through the cleaning gap and remove the abraded material that arises during the cleaning process. A hydrodynamic process is generated by the geometry of the cleaning bodies. Turbulence arises in the water flow that in turn generates very high flow speeds of the liquid through the cleaning gap. The shredded plastic to be cleaned is pressed very strongly against the cleaning ribs, in particular the inclined or curved flanks, and the peak surfaces. This improves the cleaning of the shredded plastic. With the device according to the teachings herein, there is no specified minimum solid concentration (ratio of the amount of solids, in particular amount of shredded plastic, to the amount of liquid). Low solid concentrations are also feasible with the device. In particular, solid concentrations of less than 10% can be used. The maximum solid concentration depends on the degree of contamination, or the maximum processing capacity, of the employed cleaning bodies. The maximum solid concentration can be increased by using larger cleaning bodies. The utilized amount of liquid is adapted to the degree of contamination of the shredded plastic that is to be cleaned and the heat that is generated in the process.

According to another design, the cleaning bars of the first and second cleaning body can be arranged so that they do not assume, or do not permanently assume, directly opposing positions while the at least one cleaning body rotates. Furthermore, the cleaning bars can be arranged on each of the first and second cleaning surface along several peripheral paths around the respective cleaning surface. The peripheral paths of the cleaning bars on the first cleaning surface can possess different courses than the peripheral paths of the cleaning bars on the second cleaning surface. It can furthermore be provided that the cleaning bars are arranged along the peripheral path between each pair of neighboring cleaning ribs. The peripheral paths can each run ring-like about the longitudinal axis of the respective cleaning body. A plurality of such parallel, ring-shaped peripheral paths can then be formed. Having different peripheral paths on the first and second cleaning surface can cause the cleaning bars to not directly oppose each other during the relative rotation of the cleaning bodies. Accordingly, the ring-shaped peripheral paths can for example be arranged offset from each other viewed in the direction of the longitudinal axis of the cleaning bodies. This reduces the mechanical stress on the shredded plastic. The cleaning bodies can hence be designed different from each other. They can however both possess directly opposing peripheral paths with cleaning bars along their outer and/or inner edge.

It is alternatively also possible for the cleaning surfaces of the cleaning bodies to be formed identical to each other. At least some of the peripheral paths on the first cleaning surface and the peripheral paths on the second cleaning surface can have the same course, wherein at least the cleaning bars along peripheral paths with the same course are in each case arranged only between each second pair of neighboring cleaning ribs. In particular, all the peripheral paths on the first cleaning surface and the peripheral paths on the second cleaning surface can have the same course, and furthermore in particular the cleaning bars along peripheral paths with the same course can in each case be arranged only between each second pair of neighboring cleaning ribs. An alternating arrangement is thereby provided, wherein the cleaning bars are only provided in each second channel between neighboring cleaning ribs. When the cleaning bodies rotate relative to each other, the cleaning bars are directly opposed for 50% of the processing time. Whereas this design possesses advantages in terms of the production costs of the cleaning bodies, it leads to greater stress on the shredded plastic. It is in particular highly suitable for very thin shredded plastic (plastic film shreds).

The invention also relates to a method for removing impurities from shredded plastic using a device according to the description herein, wherein at least one cleaning body is rotationally driven about its longitudinal axis by means of the drive apparatus, wherein liquid, in particular water or an aqueous solution, is fed into the cleaning gap by means of the liquid feed apparatus, wherein shredded plastic is fed into the cleaning gap by means of the feed apparatus, and wherein the shredded plastic is conveyed through the cleaning gap. The conveyance of the shredded plastic through the cleaning gap occurs from the relative rotation of the cleaning bodies to each other and from the supply of liquid.

In the method, previously comminuted plastic waste in the form of shredded plastic (flakes) is added to the device. The shredded plastic is cleaned by specific cleaning body friction in the above-described manner, wherein the amount of friction can be adjusted by regulating the cleaning body distance. As mentioned above, this distance can be easily realized by a relative shift of the cleaning bodies to each other along their longitudinal axis. A suspension is created with components comprising the fed liquid such as water, the cleaned shredded plastic, and the substances abraded therefrom (such as adhesive, cellulose, labels, organic contaminants, etc.). After cleaning, the suspension with the impurities is separated from the cleaned shredded plastic.

According to another design, the shredded plastic to be cleaned is subject to preliminary cleaning in a preliminary cleaning device before being fed into the cleaning gap and conveyed through the cleaning gap of the device actually provided for removing impurities. The preliminary cleaning device possesses a first cleaning disk with a first cleaning surface, and a second cleaning disk with a second cleaning surface, wherein the cleaning surfaces oppose each other and delimit a cleaning gap between each other that is greater than the cleaning gap of the device subsequently used to remove impurities from the shredded plastic. At least one of the, e.g. cylindrical, cleaning disks can be rotated about its rotational axis, which is simultaneously its cylindrical axis; liquid, in particular water or an aqueous solution, can be fed into the cleaning gap of the preliminary cleaning device; and the shredded plastic to be cleaned can be fed between the cleaning disks of the preliminary cleaning device and conveyed through the cleaning gap. Then the shredded plastic to be cleaned is fed to the above-explained (primary) cleaning device. A two-step cleaning process therefore occurs.

The dimensions of the preliminary cleaning device can be smaller than the primary cleaning device that is subsequently used. Since the cleaning gap of the preliminary cleaning device is larger than that of the primary cleaning device, it can result in only slight or basically no abrasive processing of the shredded plastic. In particular, the cleaning gap of the preliminary cleaning device is selected by adjusting the distance between the cleaning disks so that impurities removed from the shredded plastic during the preliminary cleaning, such as removed cellulose, are basically not destroyed. This makes it significantly easier to subsequently clean the shredded plastic in the primary cleaning device.

It is also possible to subject the shredded plastic to be cleaned to a preliminary cleaning in a preliminary cleaning device before being fed into the cleaning gap and conveyed through the cleaning gap of the device, wherein the preliminary cleaning device comprises a hollow cleaning cylinder with a first cleaning surface on its cylindrical inner surface, and a cleaning cylinder arranged in the hollow cleaning cylinder with a second cleaning surface on its cylindrical outer surface. The cleaning surfaces of the preliminary cleaning device delimit a cleaning gap between each other that is greater than the cleaning gap of the device subsequently used to remove impurities from the shredded plastic. The hollow cleaning cylinder and/or the cleaning cylinder are rotationally driven. The cleaning gap of the preliminary cleaning device can also be selected by adjusting the distance between the hollow cleaning cylinder and the cleaning cylinder so that impurities removed from the shredded plastic during the preliminary cleaning are basically not destroyed.

Finally, it is also possible to subject the shredded plastic to be cleaned to a preliminary cleaning in a preliminary cleaning device before being fed into the cleaning gap and conveyed through the cleaning gap of the device, wherein the preliminary cleaning device comprises at least one preliminary cleaning body with an at least sectionally conical outer surface forming a first cleaning surface, and at least one second preliminary cleaning body with an at least sectionally conical inner surface forming a second cleaning surface. The cleaning surfaces of the preliminary cleaning device delimit a cleaning gap between each other that is greater than the cleaning gap of the device subsequently used to remove impurities from the shredded plastic. The first preliminary cleaning body and/or the second preliminary cleaning body are rotationally driven. The cleaning gap of the preliminary cleaning device can also be selected by adjusting the distance between the first preliminary cleaning body and the second preliminary cleaning body so that impurities removed from the shredded plastic during the preliminary cleaning are basically not destroyed.

All of the aforementioned three alternative designs can in particular ensure that impurities such as cellulose removed from the shredded plastic during the primary cleaning are basically not destroyed, i.e., exist as an intact structure (such as cellulose fibers). These can then be easily removed from the process liquid, in particular from the process water, by means of filtration and/or straining. If impurities are in contrast excessively destroyed (e.g., cellulose fibers excessively crushed), they can only be removed by means of elaborate process water purification methods.

Certain embodiments of the invention are explained below in greater detail with reference to figures.

BRIEF DESCRIPTION OF THE DRAWINGS

If not otherwise specified, the same reference numbers indicate the same objects in the figures.

DETAILED DESCRIPTION

Figure 1:
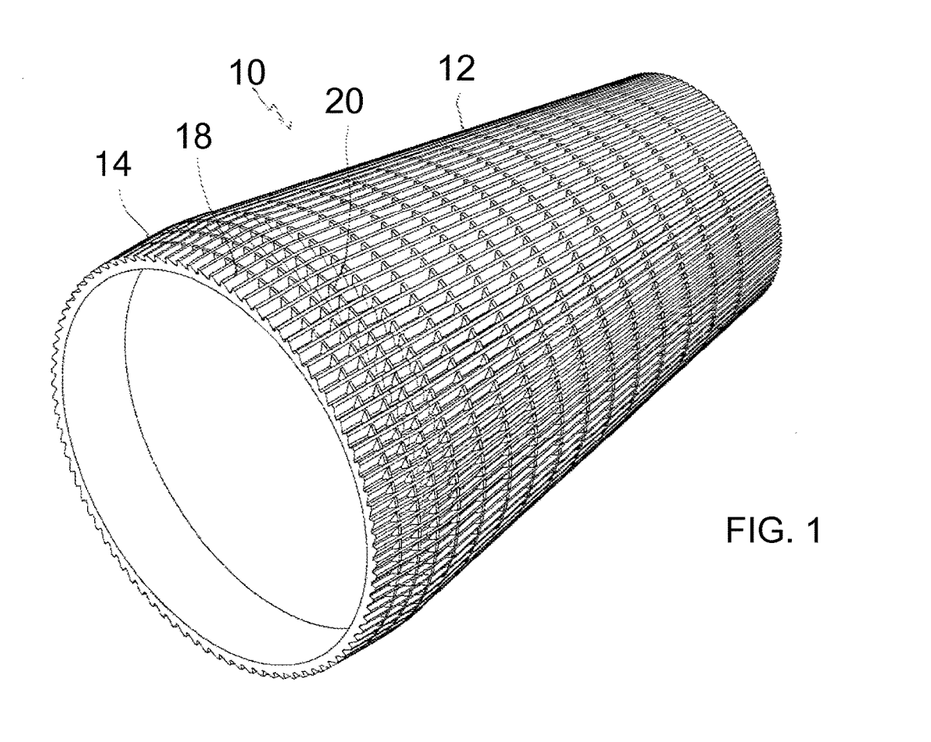
FIG. 1 shows a perspective view of a first cleaning body of a device according to a first embodiment of the invention.
Figure 2:
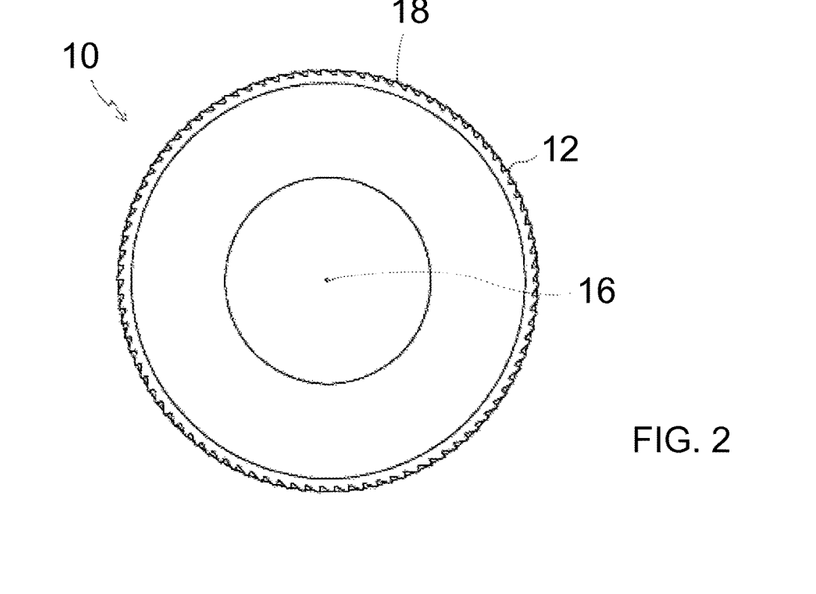
FIG. 2 shows a front view of the first cleaning body from FIG. 1.

FIG. 1 shows a perspective view of a first cleaning body 10 of a device according to a first embodiment of the invention. FIG. 2 shows a frontal view of the first cleaning body 10 from FIG. 1. The cleaning body 10 possesses a hollow frustoconical basic shape with a sectionally tapered, or respectively conical first cleaning surface 12. In the front area in FIG. 1, the tapered, or respectively conical section of the cleaning surface 12 transitions into a regular cylindrical section 14. The longitudinal axis, which is simultaneously the rotational axis of the cleaning body 10, is depicted in FIG. 2 with reference number 16. A plurality of cleaning ribs 18 extending in the longitudinal direction of the cleaning body 10 is arranged on the cleaning surface 12. It can be seen that the cleaning ribs 18 are arranged substantially parallel to each other taking into account the conical tapering of the cleaning body 10 in the longitudinal direction. Of course, the spacing between the neighboring cleaning ribs decreases as the tapering of the cleaning body, or respectively cleaning surface, increases. It may therefore be necessary to remove, for example, each second cleaning rib starting at a specific degree of tapering in a strongly tapering section of the cleaning surface.

In the portrayed example, a plurality of cleaning bars 20 are arranged between all of the neighboring cleaning ribs 18 and run transversally to the direction of extension of the cleaning ribs. The cleaning bars 20 are arranged along a plurality of ring-shaped paths around the longitudinal axis 16 of the cleaning body 10, or respectively the cleaning surface 12. It should be noted that the cleaning bars 20 do not necessarily have to be arranged along ring-shaped paths. For example, it is also conceivable for the cleaning bars 20 to be offset in the longitudinal direction of the cleaning body 10, e.g. in each second channel formed between the cleaning ribs 18.

Figure 3:
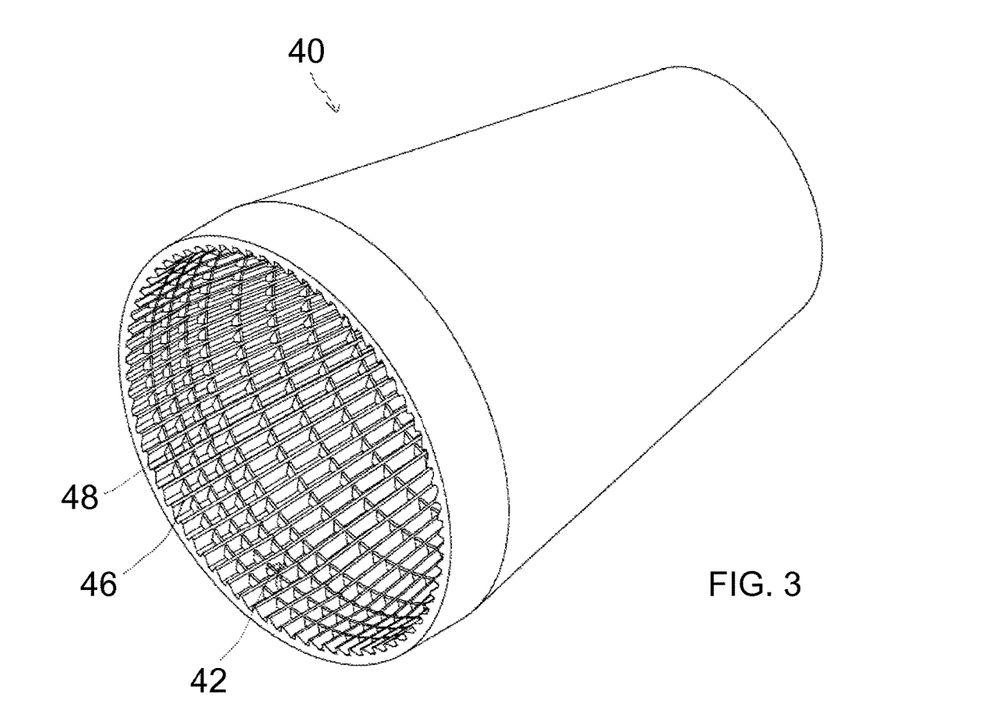
FIG. 3 shows a perspective view of a second cleaning body of a device according to the first embodiment of the invention.
Figure 4:
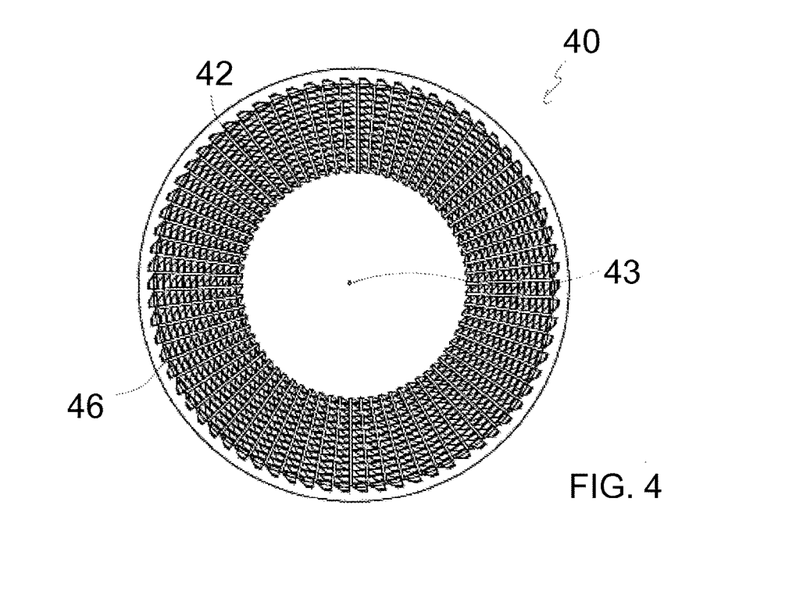
FIG. 4 shows a front view of the second cleaning body from FIG. 3.
Figure 5:
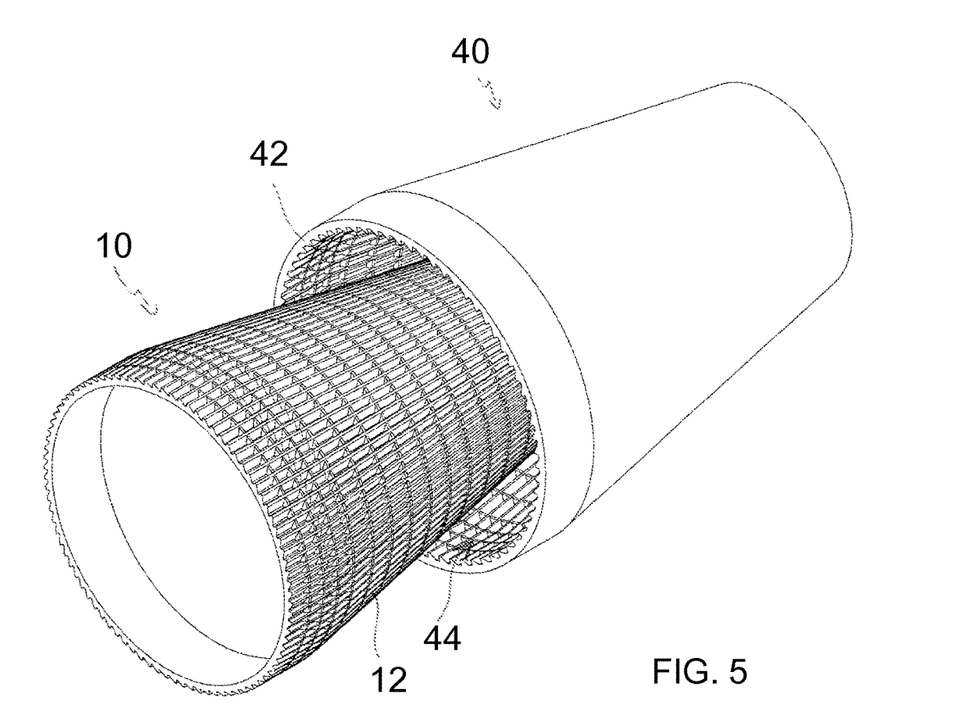
FIG. 5 shows a perspective view of the cleaning bodies from FIGS. 1 and 3 in a partially assembled state.

A second cleaning body 40 shown in FIGS. 3 and 4 furthermore belongs to the first cleaning body shown in FIGS. 1 and 2. As is known in regard to conical and drum refiners, this second cleaning body 40 has an at least sectionally conical inner surface forming a second cleaning surface 42, wherein the second cleaning body 40 is designed to accommodate the first cleaning body 10 as shown in FIG. 5. The first and second cleaning surfaces 12, 42 then lie opposite each other and delimit a cleaning gap 44 between each other. At least one of the cleaning bodies 10, 40 can be rotationally driven by means of a suitable rotary drive. The longitudinal axis of the second cleaning body 40 is depicted in FIG. 4 with reference number 43. The second cleaning surface 42 of the second cleaning body 40 can be designed largely identical to the first cleaning surface 12 of the first cleaning body 10. In particular, the second cleaning surface 42 also possesses cleaning ribs 46 designed identical to the cleaning ribs 18 of the first cleaning body 10. In addition, the second cleaning body 40 as well possesses a plurality of cleaning bars 48 that are between all the cleaning ribs 46 neighboring each other and in turn are arranged along a plurality of ring-shaped paths about the longitudinal axis of the second cleaning body 40, or respectively cleaning surface 42.

Figure 6:
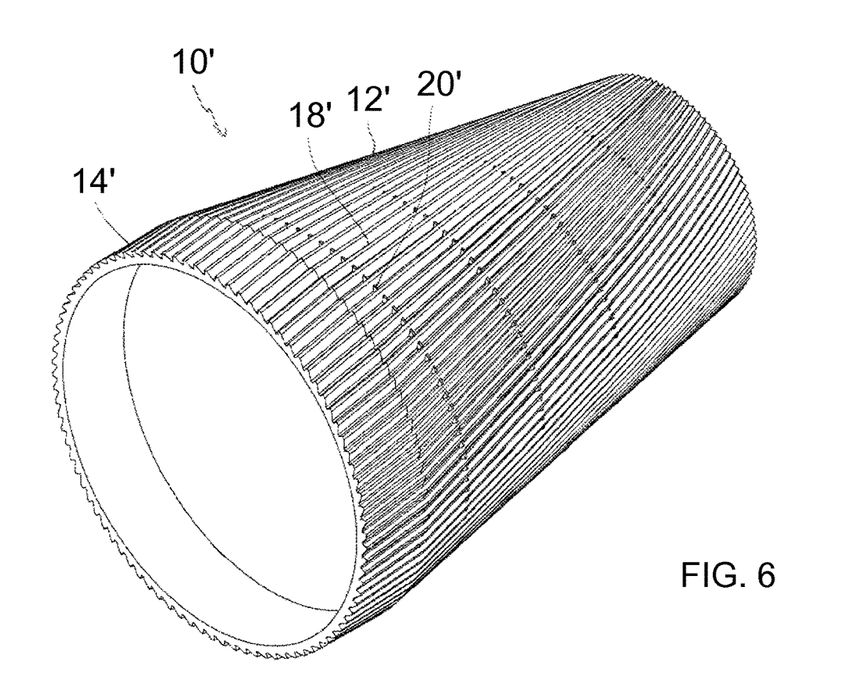
FIG. 6 shows a perspective view of a first cleaning body of a device according to a second embodiment of the invention.

FIG. 6 shows an alternative embodiment of a first cleaning body 10'. Its design largely corresponds to the cleaning body shown in FIGS. 1 and 2. It also possesses a hollow frustoconical basic shape with a sectionally tapered, or respectively conical, first cleaning surface 12'. In the front area in FIG. 6, the tapered, or respectively conical section of the cleaning surface 12' again transitions into a regular cylindrical section 14'. In contrast to the embodiment in FIGS. 1 and 2, the cleaning ribs 18' in the embodiment in FIG. 6 run in a helical shape over the cleaning surface 12'. Again, a plurality of cleaning bars 20' are arranged between all of the neighboring cleaning ribs 18' and extend transversally to the direction of extension of the cleaning ribs 18'. The cleaning bars 20' are arranged along a helical path around the longitudinal axis of the cleaning body 10', or respectively the cleaning surface 12'. It should be noted that the cleaning bars 20' can also be arranged along a plurality of helical paths. In addition, the cleaning bars 20' can be arranged offset in the longitudinal direction of the cleaning body 10', e.g. in each second channel formed between the cleaning ribs 18'. The first cleaning body 10' shown in FIG.

6 also has a second cleaning body (not shown) which analogously interacts with the first cleaning body 10' as shown in FIG. 5 for the first embodiment. The second cleaning body can have a cleaning surface on its inner surface designed identical to the cleaning surface 12' of the first cleaning body 10'.

Figure 7:
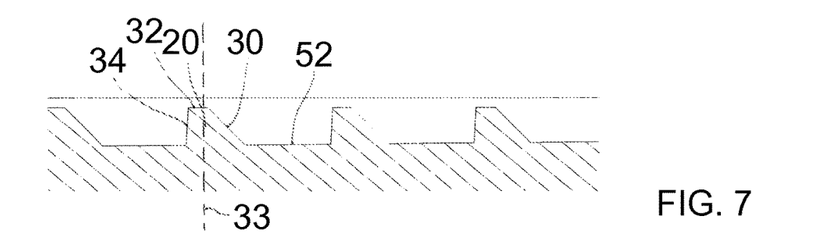
FIG. 7 shows a sectional representation of the first cleaning body from FIG. 1 in the direction of the longitudinal axis.

The design of the cleaning ribs 18 and cleaning bars 20 of the cleaning body 10 shown in FIGS. 1 and 2 is shown in greater detail in FIGS. 7 to 11. Of course, the design of the cleaning ribs 18 and cleaning bars 20 of the cleaning body 10' shown in FIG. 6 largely corresponds to the design shown in FIGS. 7 to 11. For example in FIG. 8, it can be seen that the cleaning ribs 18 each possess an inclined first flank 24 relative to the vertical axis of the cleaning ribs 18 portrayed in FIG. 8 with reference number 22. The first flank 24 terminates in a peak surface 26 perpendicular to the vertical axis 22. The peak surface 26 in turn terminates in a second flank 28 of the cleaning ribs 18 that, in the portrayed example, lies in a plane that is nearly parallel to the vertical axis 22. FIG. 7 shows that the cleaning bars 20 each possess a surface 30 that, viewed in the peripheral direction of the first cleaning body 10, rises in a ramp-like manner and terminates in a peak surface 32 that lies in a plane perpendicular to a normal on the surface of the first cleaning body 10 indicated with reference number 33 in FIG. 7. The surface 34 of the cleaning bars opposite the surface 30 is also arranged in a plane that is nearly parallel to the normal 33. The height of the cleaning bars 20, in particular of their peak surfaces 32, is less than the height of the cleaning ribs 18, in particular of their peak surfaces 26. It is furthermore discernible that a flat base surface 52 is formed in each case between sequentially arranged cleaning bars 20.

Figure 8:
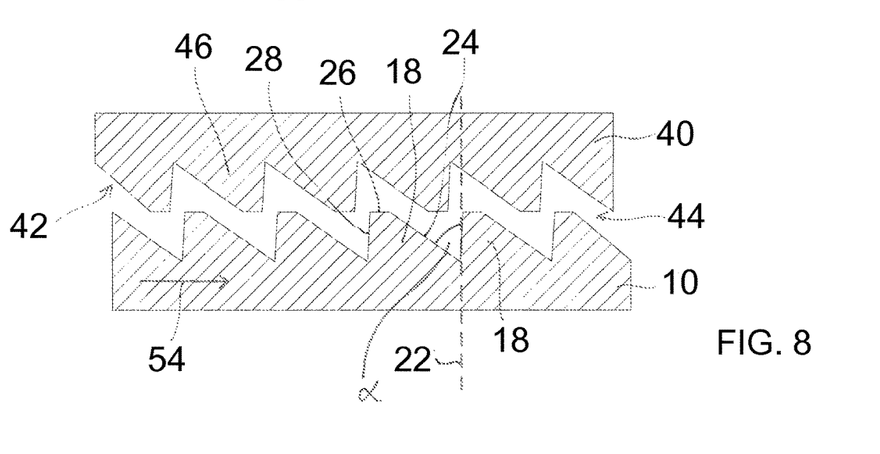
FIG. 8 shows a section of the first cleaning body from FIG. 1 and the second cleaning body from FIG. 3 in a cutaway view in a peripheral direction perpendicular to the longitudinal axis of the cleaning body.

FIG. 8 depicts a section of the first cleaning body 10 shown in FIGS. 1 and 2 with the second cleaning body 40 shown in FIGS. 3 and 4. A cleaning gap 44 is correspondingly formed between the cleaning surfaces 12 and 42 of the first and second cleaning bodies 10, 40. As already noted, the second cleaning surface 42 of the second cleaning body 40 can be designed largely identical to the first cleaning surface 12 of the first cleaning body 10. However, the ring-shaped paths of the cleaning ribs of the first and second cleaning bodies 10, 40 can be offset from each other in the longitudinal direction of the cleaning bodies 10, 40 such that the cleaning bars 20, 48 do not move into a position in which they directly oppose each other upon a relative rotation between the cleaning bodies 10, 40.

The device according to the invention may furthermore comprise a drive apparatus (not shown) by means of which, for example, the first cleaning body 10 can be rotated about its rotational axis. Furthermore, the device may comprise a plastic feed apparatus (also not shown) by means of which the shredded plastic to be cleaned can be fed into the cleaning gap 44. Finally, the device may comprise a liquid feed apparatus (also not shown) by means of which water can be guided into the cleaning gap 44 in the shown example.

Furthermore, it can be seen in FIG. 8 that the cleaning ribs 18 are arranged in a direct sequence so that they produce a sawtooth profile transversally to their longitudinal extension in the sectional view in FIG. 8. Finally, it can be seen that the cleaning ribs 46 of the second cleaning body 40 are thus designed identical to the cleaning ribs 18 of the first cleaning body 10. The rotational direction of the first cleaning body 40 while being rotated by the drive apparatus is illustrated in FIG. 8 by the arrow 54. It can be seen that the inclined flanks 24 of the cleaning ribs 18, 46 are always the leading flanks when the first cleaning body 10 rotates. It should also be noted that the inclined flanks 24 of the cleaning ribs 18, 46 are each at an angle α to the vertical axis 22, which angle is greater than 45°. This makes available a comparatively large abrasive surface on the inclined flanks 24, which improves the cleaning effect.

Figure 9:
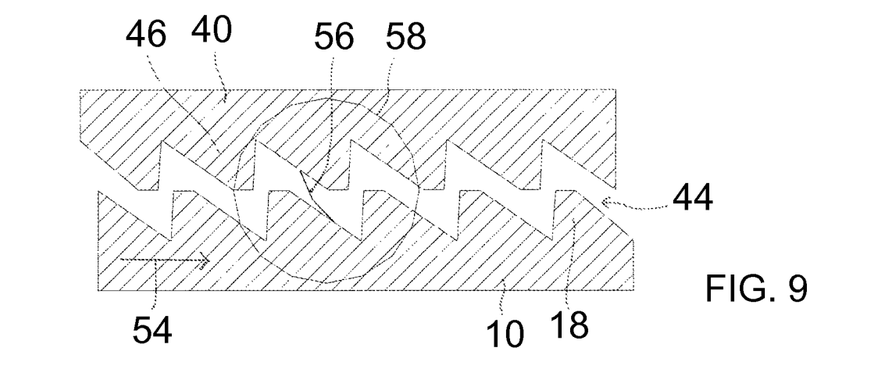
FIG. 9 shows the view from FIG. 8 in a first operating state.
Figure 10:
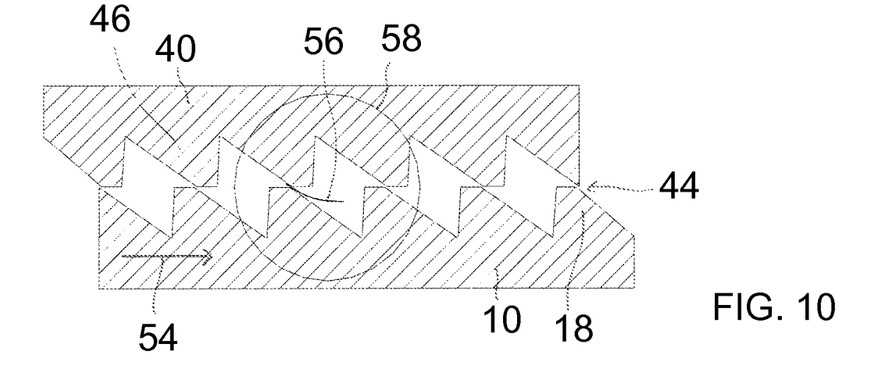
FIG. 10 shows the view from FIG. 8 in a second operating state.
Figure 11:
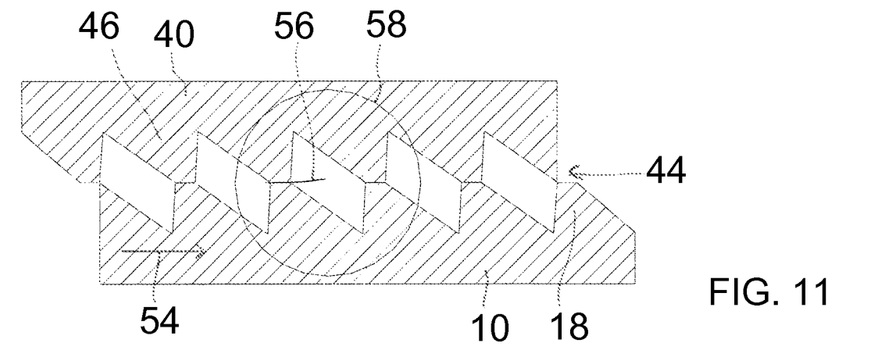
FIG. 11 shows the view from FIG. 8 in a third operating state.

On the basis of the illustration in FIG. 8, the cleaning of a piece of shredded plastic 56, in particular a plastic flake 56, will be illustrated with reference to FIGS. 9 to 11. FIG. 9 shows the relative position of the cleaning bodies 10, 40 to each other as shown in FIG. 8. The plastic flake 56 is located within the circle 58 shown in FIGS. 9 to 11 for reasons of illustration. In FIG. 9, the plastic flake 56 is in a free area between opposing cleaning ribs 18, 46 in a slightly kinked or respectively bent shape. During the rotary movement of the first cleaning body 10 along the arrow 54, the plastic flake 56 then passes between the peak surfaces of the cleaning ribs 18, 48 as shown in FIGS. 10 and 11. The plastic flake 56 is thereby stretched and abrasively contacts the curved flanks and peak surfaces of the participating cleaning ribs 18, 46. This leads to an abrasion of impurities adhering to the surfaces of the plastic flake 56. This effect is enhanced by the very high flow speeds of the water conducted through the cleaning gap 44 arising from the geometry of the cleaning the bodies 10, 40.

It can also be provided that the shredded plastic to be cleaned is subject to preliminary cleaning in a cleaning device (not shown) before being fed into the cleaning gap and conveyed through the cleaning gap of the device actually provided for removing impurities as explained above.

The invention claimed is:
1. A device for removing impurities from shredded plastic, comprising:
   a first cleaning body having at least one of a sectionally tapered or a cylindrical outer surface forming a first cleaning surface;
   a second cleaning body having at least one of a sectionally tapered or a cylindrical inner surface forming a second cleaning surface, wherein the second cleaning body accommodates the first cleaning body, and the first cleaning surface and the second cleaning surface oppose each other and delimit a cleaning gap between each other;
   a drive apparatus by which at least one of the first cleaning body or the second cleaning body is rotatable about its longitudinal axis; and
   a feed apparatus by which the shredded plastic is fed into the cleaning gap, wherein
   cleaning ribs extend over each of the first cleaning surface and the second cleaning surface,
   at least one flank of a respective cleaning rib of the cleaning ribs is inclined or curved relative to a vertical axis of the respective cleaning rib, and
   cleaning bars running transversally to a direction of extension of the cleaning ribs are arranged between at least some of the cleaning ribs neighboring each other, and wherein at least one of:
   the cleaning bars of at least one of the first cleaning body or the second cleaning body rise in a ramp-like manner in a direction parallel to a longitudinal extension of the cleaning ribs of the at least one of the first cleaning body or the second cleaning body, or
   at least one of the cleaning bars of the first cleaning body possess a lower height than the cleaning ribs of the first cleaning body or the cleaning bars of the second cleaning body possess a lower height than the cleaning ribs of the second cleaning body.

2. The device according to claim 1, wherein the at least one flank that is inclined or curved is a leading flank of at least one of the first cleaning body or the second cleaning body during a rotation.

3. The device according to claim 1, wherein the first cleaning body and the second cleaning body are designed so that a supporting pump effect is generated.

4. The device according to claim 1, wherein the cleaning ribs of at least one of the first cleaning body or the second cleaning body form a saw-tooth profile in a direction running perpendicular to their longitudinal extension.

5. The device according to claim 1, wherein each cleaning rib of at least one of the first cleaning body or the second cleaning body is rounded at least at a transition between its at least one flank that is inclined or curved and a peak surface perpendicular to its vertical axis.

6. The device according to claim 1, wherein each cleaning rib of at least one of the first cleaning body or the second cleaning body has a peak surface perpendicular to its vertical axis.

7. The device according to claim 1, wherein a distance exists between peak surfaces of the cleaning ribs of the first cleaning surface and the peak surfaces of the cleaning ribs of the second cleaning surface, the distance substantially corresponding to an average thickness of the shredded plastic fed by the feed apparatus.

8. The device according to claim 1, wherein at least one of the first cleaning body or the second cleaning body is designed as a single part, or comprises a plurality of cleaning body segments.

9. The device according to claim 1, further comprising:
a liquid feed device by which water or an aqueous solution is fed into the cleaning gap.

10. The device according to claim 1, wherein the cleaning bars of the first cleaning body and the cleaning bars of the second cleaning body are arranged so that the cleaning bars of the first cleaning body do not assume directly opposing positions to the cleaning bars of the second cleaning body while the at least one of the first cleaning body or the second cleaning body rotates.

11. The device according to claim 1, wherein the cleaning bars are arranged along several peripheral paths on each of the first cleaning surface and the second cleaning surface.

12. The device according to claim 11, wherein the peripheral paths of the cleaning bars on the first cleaning surface possess different courses than the peripheral paths of the cleaning bars on the second cleaning surface.

13. The device according to claim 11, wherein the cleaning bars are arranged along the peripheral paths between each pair of the cleaning ribs neighboring each other.

14. The device according to claim 11, wherein at least some of the peripheral paths on the first cleaning surface and some of the peripheral paths on the second cleaning surface have the same course, and wherein at least the cleaning bars along the peripheral paths with the same course are in each case arranged only between each second pair of cleaning ribs neighboring each other.

15. A method for removing impurities from shredded plastic using a device including a first cleaning body having at least one of a sectionally tapered or a cylindrical outer surface forming a first cleaning surface, a second cleaning body having at least one of a sectionally tapered or a cylindrical inner surface forming a second cleaning surface, wherein the second cleaning body accommodates the first cleaning body, the first cleaning surface and the second cleaning surface oppose each other and delimit a cleaning gap between each other, cleaning ribs extend over each of the first cleaning surface and the second cleaning surface, at least one flank of a respective cleaning rib of the cleaning ribs is inclined or curved relative to a vertical axis of the respective cleaning rib, and cleaning bars running transversally to a direction of extension of the cleaning ribs are arranged between at least some of the cleaning ribs neighboring each other, wherein at least one of: the cleaning bars of at least one of the first cleaning body or the second cleaning body rise in a ramp-like manner in a direction parallel to a longitudinal extension of the cleaning ribs of the at least one of the first cleaning body or the second cleaning body, or at least one of the cleaning bars of the first cleaning body possess a lower height than the cleaning ribs of the first cleaning body or the cleaning bars of the second cleaning body possess a lower height than the cleaning ribs of the second cleaning body, and wherein:
at least one of the first cleaning body or the second cleaning body is rotationally driven about its longitudinal axis by a drive apparatus;
liquid is fed into the cleaning gap by a liquid feed apparatus;
shredded plastic is fed into the cleaning gap by a feed apparatus; and
the shredded plastic is conveyed through the cleaning gap.

16. The method according to claim 15, wherein:
the shredded plastic to be cleaned is subject to a preliminary cleaning in a preliminary cleaning device before being fed into the cleaning gap and before being conveyed through the cleaning gap, wherein the preliminary cleaning device comprises a first cleaning disk with a first cleaning surface, and a second cleaning disk with a second cleaning surface, wherein the first and second cleaning surfaces oppose each other and delimit a cleaning gap between each other that is greater than the cleaning gap of the device subsequently used to remove impurities from the shredded plastic.

17. The method according to claim 16, wherein the cleaning gap of the preliminary cleaning device is selected by adjusting a distance between the first and second cleaning disks so that impurities removed from the shredded plastic during the preliminary cleaning are not destroyed.

18. The method according to claim 15, wherein:
the shredded plastic to be cleaned is subject to a preliminary cleaning in a preliminary cleaning device before being fed into the cleaning gap and before being conveyed through the cleaning gap, wherein the preliminary cleaning device comprises a hollow cleaning cylinder with a first cleaning surface on its cylindrical inner surface, and a cleaning cylinder arranged in the hollow cleaning cylinder with a second cleaning surface on its cylindrical outer surface, wherein the first and second cleaning surfaces delimit a cleaning gap between each other that is greater than the cleaning gap of the device subsequently used to remove impurities from the shredded plastic.

19. The method according to claim 18, wherein the cleaning gap of the preliminary cleaning device is selected by adjusting a distance between the hollow cleaning cylinder and the cleaning cylinder so that impurities removed from the shredded plastic during the preliminary cleaning are not destroyed.

20. The method according to claim 15, wherein:
the shredded plastic to be cleaned is subject to a preliminary cleaning in a preliminary cleaning device before being fed into the cleaning gap and before being conveyed through the cleaning gap, wherein the preliminary cleaning device comprises a first preliminary cleaning body with an at least sectionally conical outer surface forming a first cleaning surface, and a second preliminary cleaning body with an at least sectionally conical inner surface forming a second cleaning surface, wherein the cleaning surfaces delimit a cleaning gap between each other that is greater than the cleaning gap of the device subsequently used to remove impurities from the shredded plastic.

21. The method according to claim 20, wherein the cleaning gap of the preliminary cleaning device is selected by adjusting a distance between the first preliminary cleaning body and the second preliminary cleaning body so that impurities removed from the shredded plastic during the preliminary cleaning are not destroyed.

22. The method according to claim 17, wherein the removed impurities are then removed by at least one of filtration or straining from the liquid.

\* \* \* \* \*